United States Patent [19]
Teagno et al.

[11] Patent Number: 4,552,260
[45] Date of Patent: Nov. 12, 1985

[54] WORKPIECE FEEDING APPARATUS

[75] Inventors: Vladimiro Teagno; Alessandro Chiusa, both of Turin, Italy

[73] Assignee: AMP Incorporated, Harrisburg, Pa.

[21] Appl. No.: 561,701

[22] Filed: Dec. 15, 1983

[51] Int. Cl.[4] .............................................. B65G 21/20
[52] U.S. Cl. .................................. 198/345; 198/465.1; 29/1 A; 29/33 P
[58] Field of Search ....................... 198/345, 472, 580; 29/1 A, 33 P, 563

[56] References Cited

U.S. PATENT DOCUMENTS

| 2,890,456 | 6/1959 | Runciman. | |
| 3,478,859 | 11/1969 | Krempel et al. | 198/472 |
| 3,814,153 | 6/1974 | Schmidt. | |
| 4,116,324 | 9/1978 | Burmeister | 198/472 |
| 4,289,228 | 9/1981 | Reim et al. | 198/472 |
| 4,302,919 | 12/1981 | Hartness | 198/345 |

FOREIGN PATENT DOCUMENTS

| 1041419 | 9/1958 | Fed. Rep. of Germany. | |
| 2338498 | 3/1975 | Fed. Rep. of Germany. | |
| 2444535 | 12/1978 | France. | |
| 112737 | 8/1980 | Japan | 198/472 |
| 598735 | 3/1978 | U.S.S.R. | 29/33 P |

Primary Examiner—Joseph E. Valenza
Attorney, Agent, or Firm—Robert W. J. Usher

[57] ABSTRACT

The machine comprises a guideway 12 extending past a series of work stations 13, 13' and supporting a series of pairs of pallets 14, 14' carrying connectors 15, 15'. A return guideway 16 supporting empty, returning pallets extends under the guideway 12. Forward and return pallet indexing mechanisms 17 and 17' are carried by pallet lifts 18 and 18' movable between entry and exit ends of the respective upper and lower guideways (12, 16) to carry pallets (14, 14') between the guideways and to enable the indexing mechanism 17 and 17' to feed the pallets alternately onto the entry ends of the upper and lower guideways and receive expelled pallets (14, 14') from the exit ends thereof. Pilot mechanisms 21, 21' are arranged for vertical reciprocation into engagement with leading and trailing pallets (14, 14') on the upper and lower guideways (12, 16) alternately to confine the pallets (14, 14') together on the guideways (12, 16) in between operation of the forward and return indexing mechanisms 17 and 17'.

6 Claims, 15 Drawing Figures

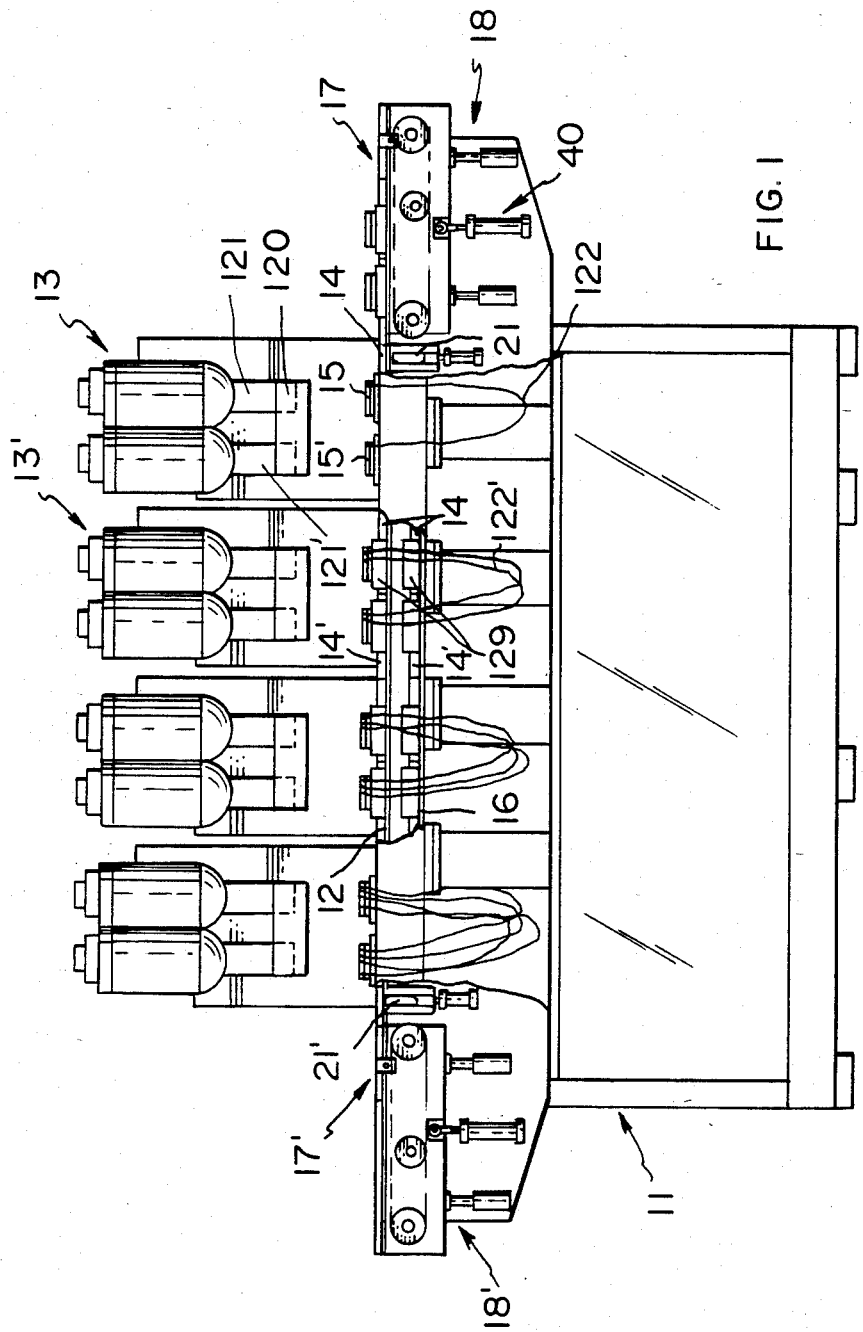

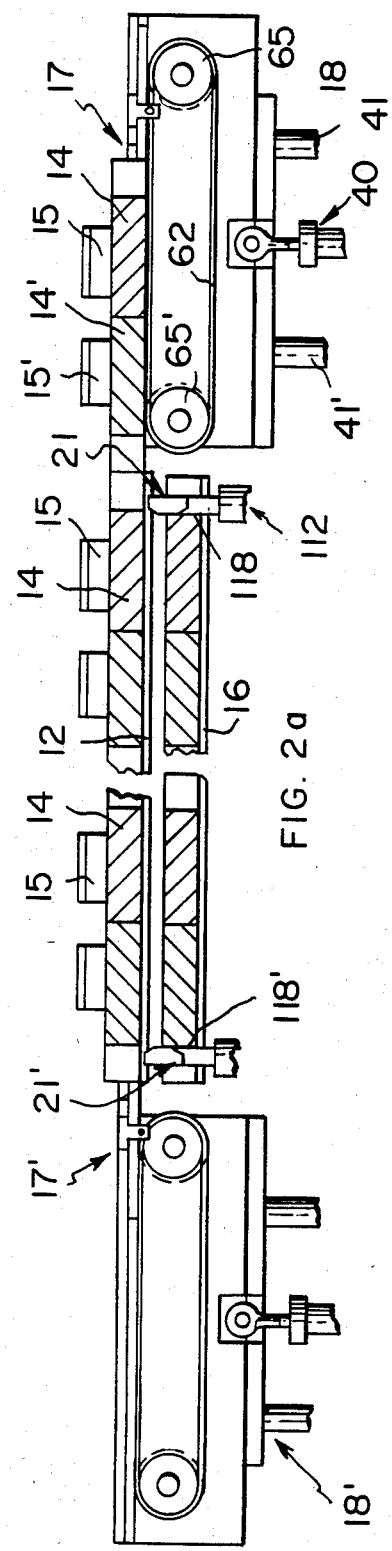
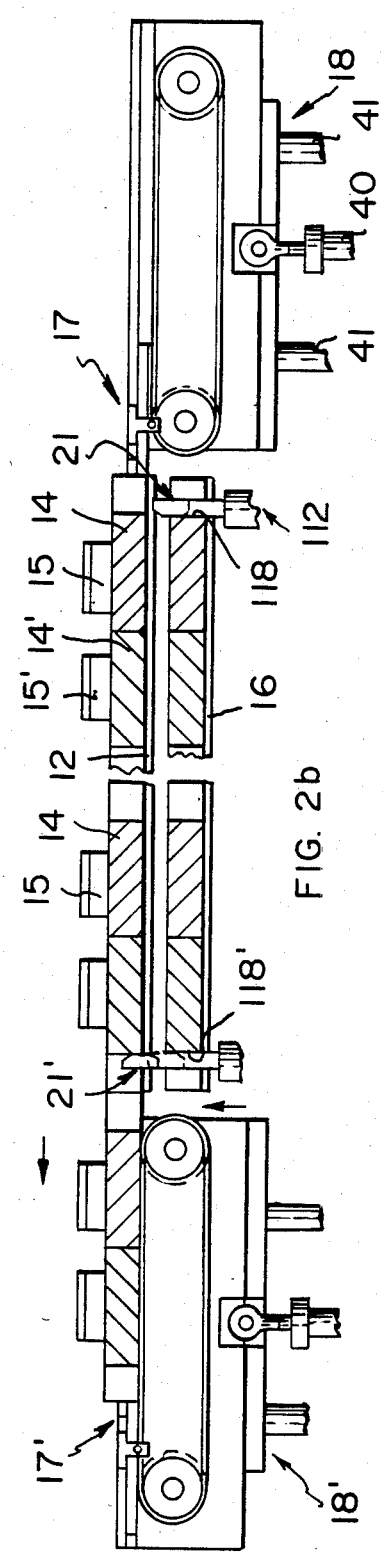
FIG. 2a
FIG. 2b

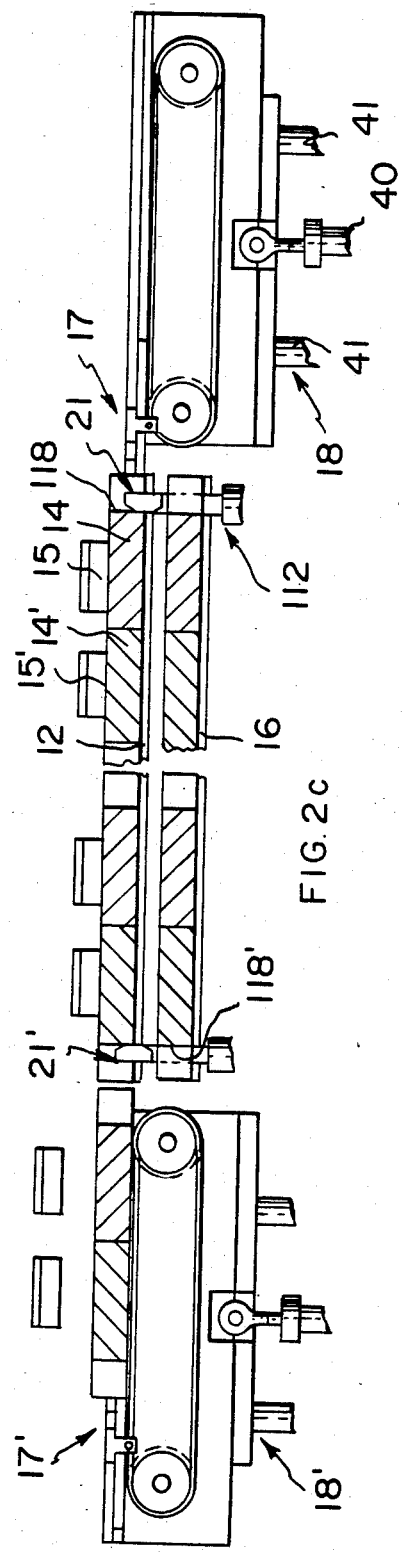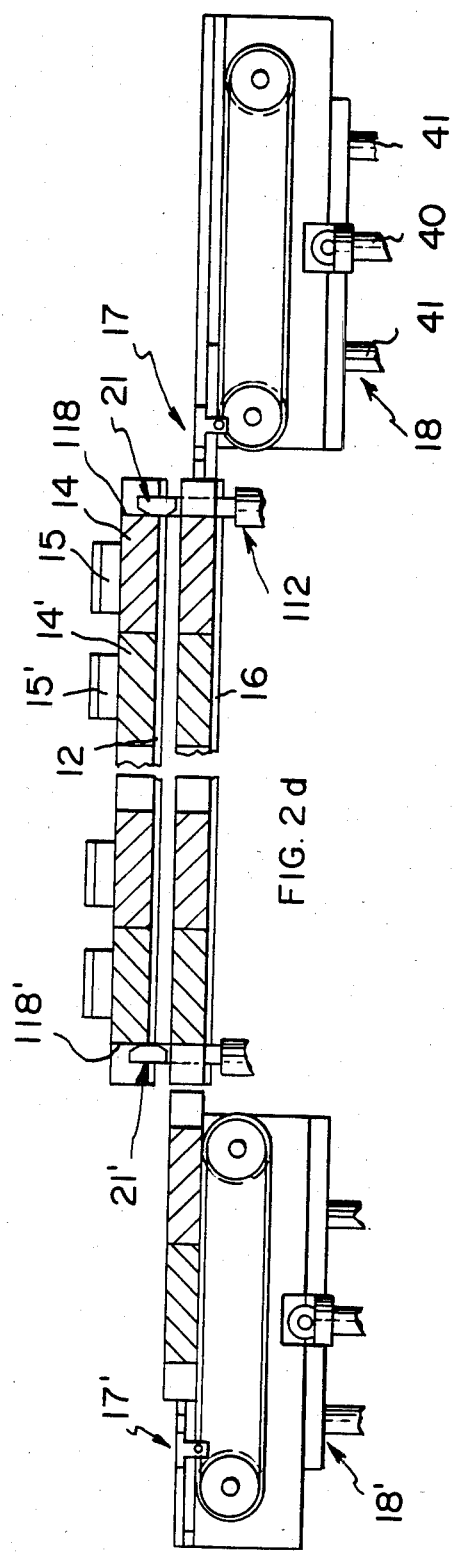

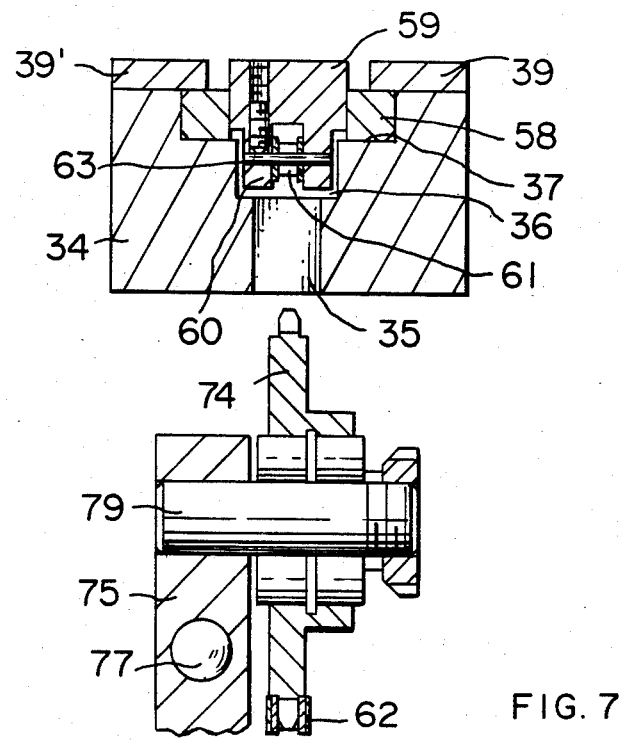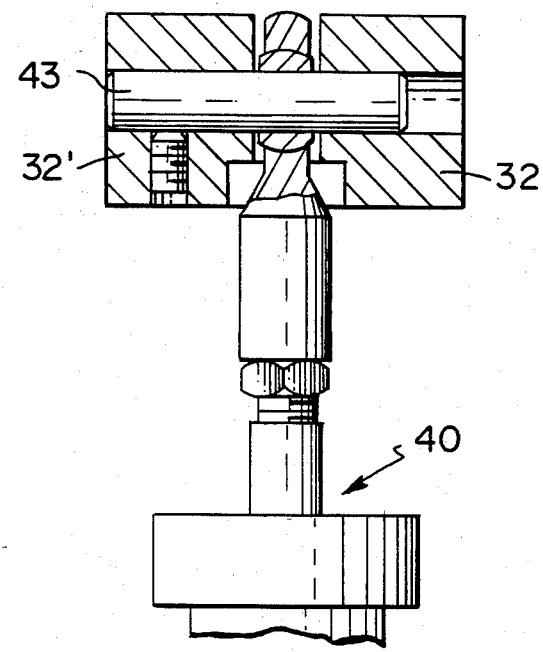
FIG. 7

WORKPIECE FEEDING APPARATUS

The invention relates to apparatus for feeding workpieces successively into alignment with respect workstations arranged in a row and, more particulary, to connector feeding apparatus for incorporation with a harness making machine.

Prior proposals for feeding workpieces successively into alignment with respective workstations arranged in a row to enable successive operation to be performed on each workpiece have either involved relatively complex and expensive mechanisms subject to wear and requiring frequent servicing or, have not been capable of providing, repeatedly, the precise alignment of the workpieces necessary for some operations such as the termination of a wire by insertion into a narrow slot.

According to one aspect of the present invention, there is provided apparatus for feeding workpieces successively into precise alignment with respective workstations arranged in a row comprising a frame providing a feed path extending past the workstations between an exit and an entry end; a plurality of individual pallets having precise longitudinal dimensions and adapted to carry respective workpieces; means to index a series of the pallets in end-to-end relation along the feed path substantially to fill the feed path between the entry and exit ends bringing pallets successively into coarse alignment with respective workstations; and, pallet positioning means arranged to urge the pallets of the series together longitudinally of the feed path into end-to-end abutment precisely to align respective workpieces with the workstations.

The apparatus of the invention is relatively simple and inexpensive to construct while precise alignment of the workpieces in essence depends only on the length of the pallets and the distance between the positioning means both of which can be maintained to very close tolerances.

There are very few moving parts subject to wear which will affect the maintenance of the tolerances and, therefore, very little servicing in the field is required.

According to another aspect of the invention, there is provided a method of feeding workpieces successively into precise alignment with respective workstations arranged in a row comprising the steps of loading the workpieces on respective individual pallets of a series of pallets, each pallet having precise longitudinal dimensions, indexing the series of pallets in end-to-end relation along a feed path extending past the workstations to bring the workpieces successively into coarse alignment with respective workstations and urging the pallets together longitudinally of the feed path into end-to-end abutment thereby precisely to align respective pallets with the workstations.

According to a further aspect of the invention, there is provided apparatus for feeding workpieces successively into alignment with respective workstations arranged in a row comprising a frame providing a feed path extending past the workstations between an entry and an exit end, a plurality of individual pallets each adapted to carry a workpiece and having a precise longitudinal dimension, means to drive pallets longitudinally into the entry end of the feed path thereby to shunt pallets of a series of the pallets filling the feed path successively into alignment with respective work stations and to expel pallets from the exit end of the feed path.

Preferably, a return path extends below the feed path and has an entry and an exit end adjacent the entry and exit ends respectively of the feed path, a pallet lift being mounted for movement between the exit end of the return path and the entry end of the feed path to deliver pallets from the exit end of the return path to the entry end of the feed path.

A specific example of a connector feeding apparatus according to the invention incorporated in a harness making machine will now be described with reference to the accompanying drawings in which:

FIG. 1 is a schematic front elevational view of the harness making machine with frame parts partly broken away for clarity;

FIGS. 2 *a–e* are similar views of a portion of the connector feeding apparatus at successive stages of operation further simplified for clarity;

FIG. 7 is a cross-sectional view taken along line 7—7 of FIG. 3;

Figure 2E:
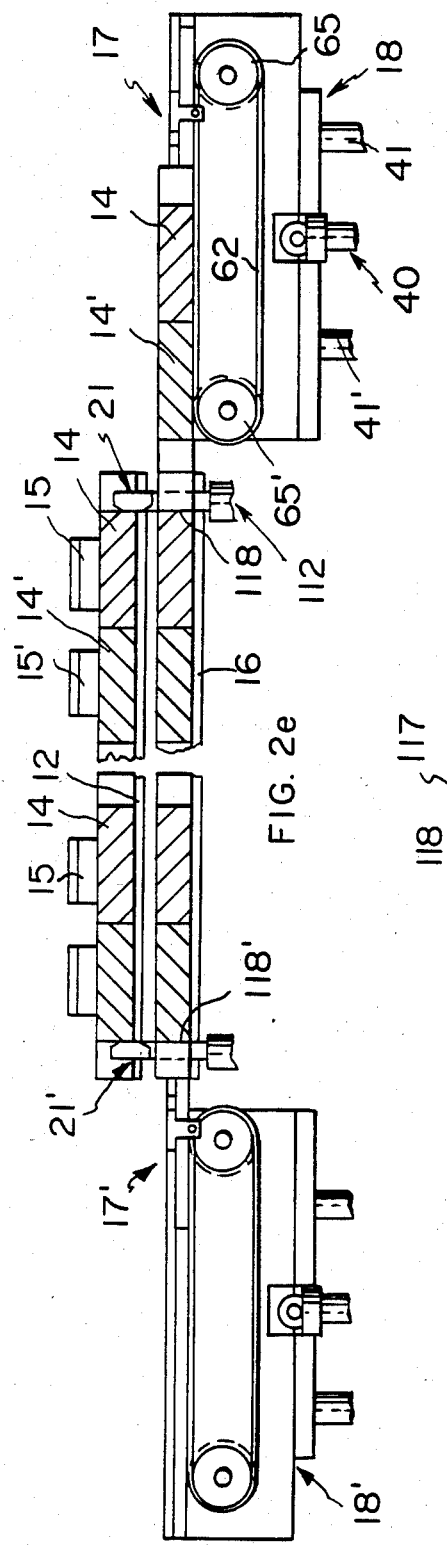

Briefly described with reference to FIG. 1, the machine comprises a frame 11 defining a guideway 12 providing a feed path extending past a series of work stations 13, 13' and supporting a series of pairs of pallets 14, 14' carrying connectors 15, 15'. A return guideway 16 supporting empty, returning pallets extends under the guideway 12. Forward and return pallet indexing mechanisms 17 and 17' are carried by pallet lifts 18 and 18' respectively mounted on the frame for simultaneous vertical movement between entry and exit ends of the respective upper and lower guideways to carry pallets between the guideways and to enable the indexing mechanism 17 and 17' to feed the pallets alternately onto the entry ends of the upper and lower guideways and receive expelled pallets from the exit ends thereof. Pilot mechanisms 21, 21' are mounted on the frame for vertical reciprocation into engagement with leading and trailing pallets on the upper and lower guideways alternately to confine the pallets together on the guideway in between operation of the forward and return indexing mechanisms.

As shown more particularly in FIG. 3 and FIGS. 6 to 8, the lift 18 comprises a carriage 31 formed by spaced base members 32, 32' and upright frame plates 33, 33' and 30, 30' upstanding from opposite lateral sides and ends of the base member supporting a longitudinally extending channel member 34 formed with a central slot 35 to define a chain-receiving guideway 36 aligned below a pallet receiving track 37. Cover plates 39, 39' are mounted on the opposite sidewalls of the member 34, 34' partly to overlie the track 37 to confine a pallet 12 for longitudinal sliding movement therein. The carriage is mounted for vertical movement on columns 41, 41' received in sleeves 42, 42' mounted on an extension of frame 11, such movement being effected by a double acting pistol and cylinder arrangement 40 connected to the base member by clevis pin 47. Microswitches 43, 43' are mounted on the frame extension in spaced relation for engagement with cam surfaces on the lower end of guide 41' to detect the extremes of travel of the lift and a stop 45 is mounted in the sleeve 42 in registry with a rebate 46 in the post thereby to limit the extent of vertical movement.

Figure 3:
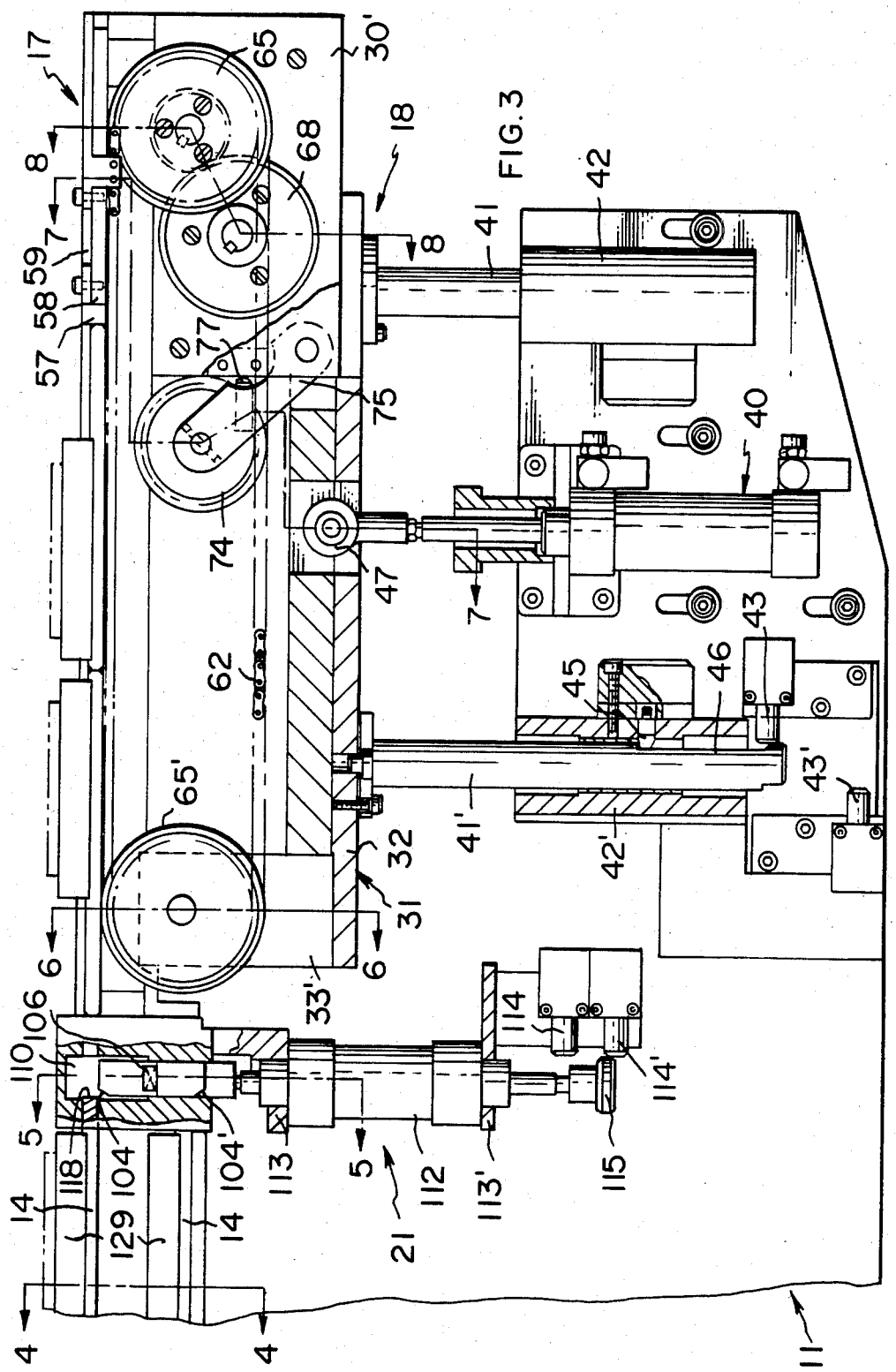
FIG. 3 is a front elevational view of a pallet lift at one end of the apparatus incorporating an indexing mechanism.
Figure 9:
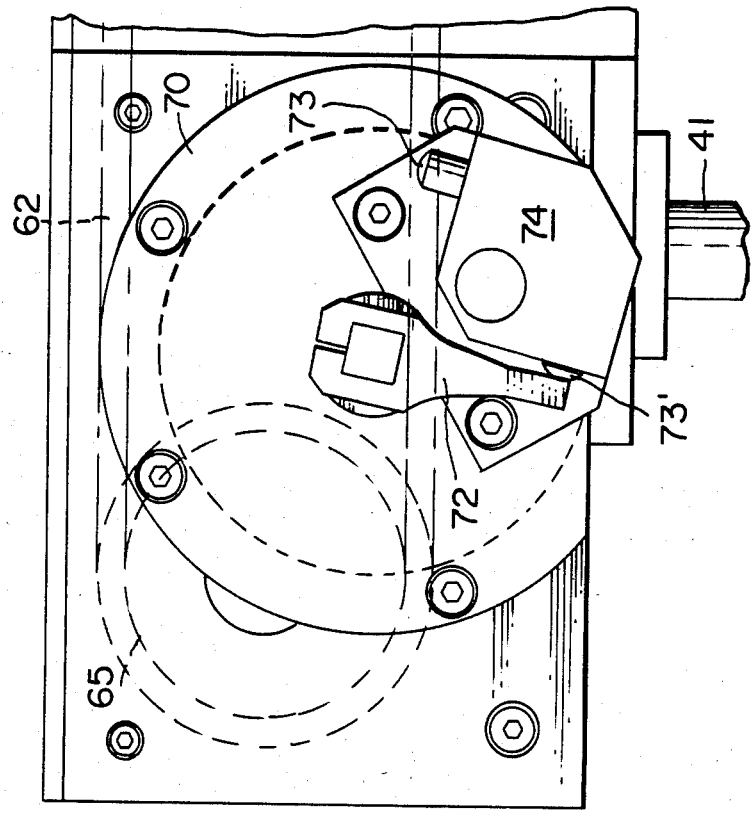
FIG. 9 is a rear elevational view (in the direction of 9—9 of FIG. 8) showing a buffer unit.
Figure 6:
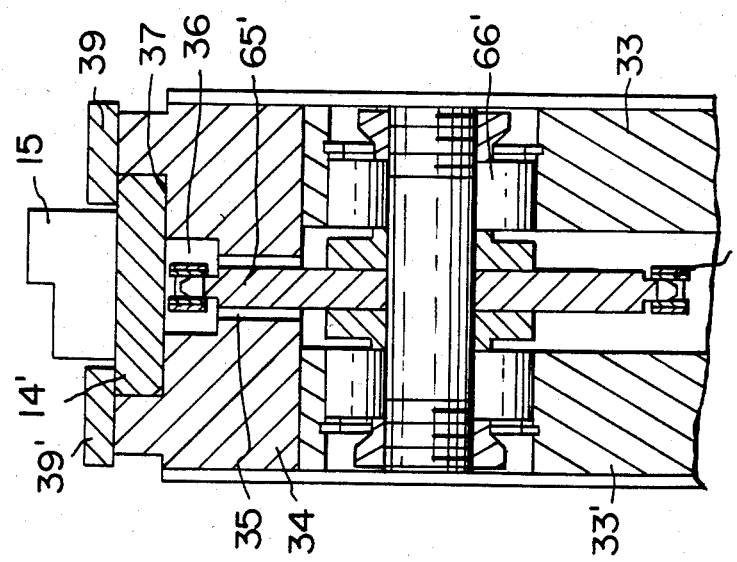
FIG. 6 is a cross-sectional view taken along line 6—6 of FIG. 3.
Figure 8:
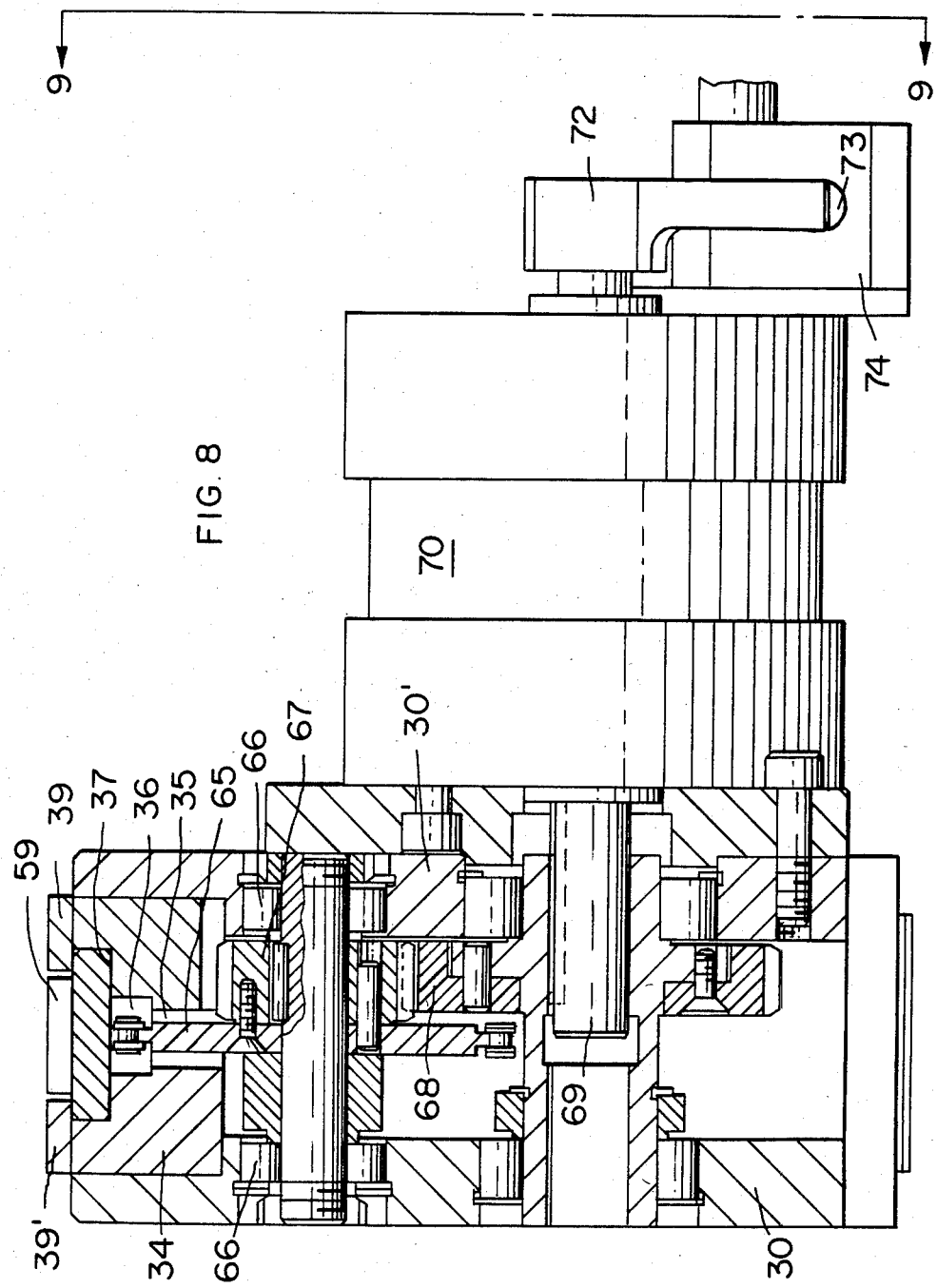
FIG. 8 is a cross-sectional view taken along line 8—8 of FIG. 3.
Figure 10:
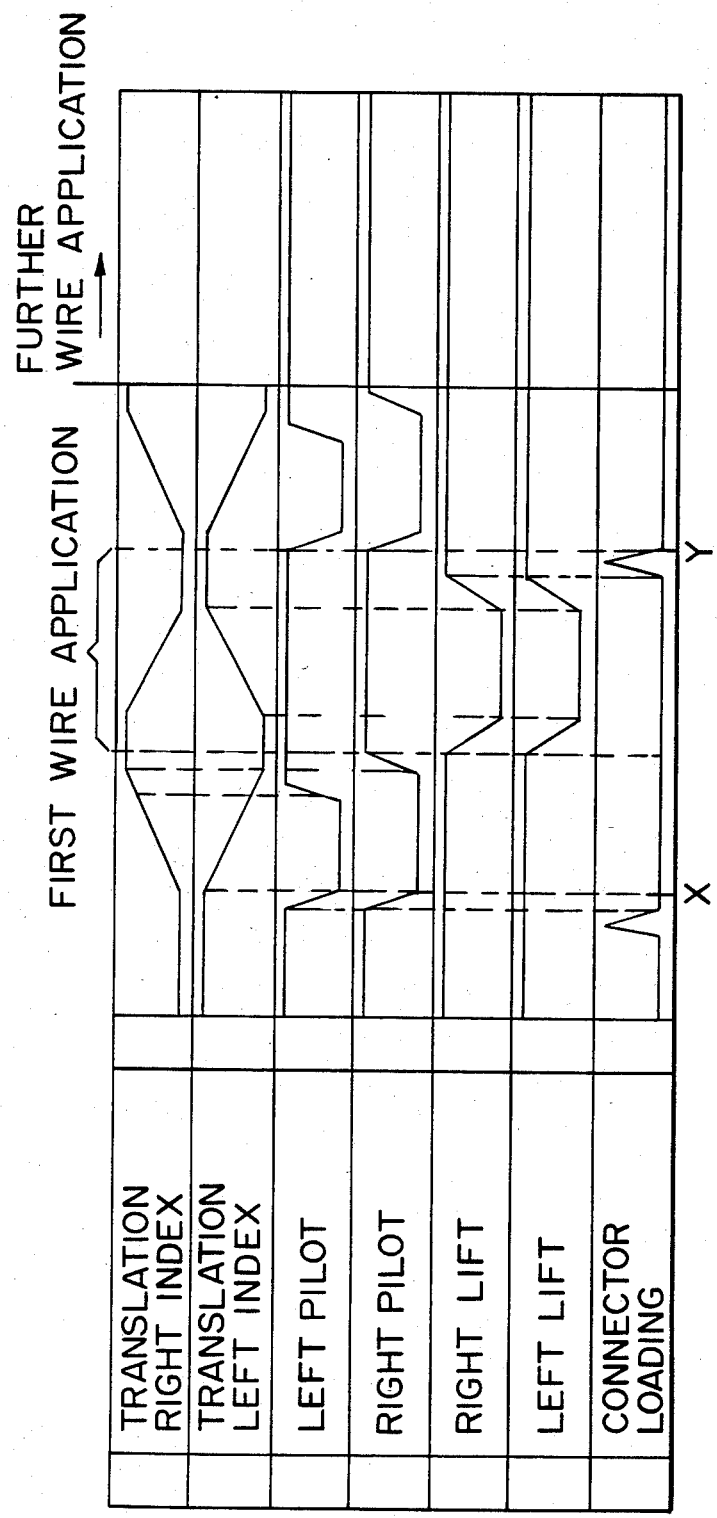
FIG. 10 is a timing diagram.

The indexing mechanisms 17, 17' are similar, the indexing mechanism 17 comprising a ram 57 fixed on a leading end of a slide 58 through which extends a T-shape securing bar having a clevis 60 fixed to a link 61 of a drive chain 62 by a clevis pin 63. The chain is supported by spaced sprocket wheels 65, 65' mounted in apertures in the frame plates 33, 33' and 30, 30' on bearings 66, 66'. As shown in FIG. 8, the sprocket wheel 65 is keyed to a gear 67 meshed with a drive gear 68 fixed to one end of the piston rod 69 of a conventional single acting rotary piston and cylinder arrangement 70 mounted on the side of a frame plate 30'. As shown in FIGS. 8 and 9, an arm 72 is fixed on the other end of the piston rod for rotation into engagement with hydraulic buffers 73, 73' of a buffer unit 74 on the cylinder casing at the extremities of travel thereby reducing stress. As shown in FIGS. 3 and 7, a jockey wheel 74 is rotatably mounted on a pin 79 fixed to one end of an arm 75 pivotally mounted at its other end to a rebated portion of the base 31. The jockey wheel is biassed to tension the chain by a screw 77 engaging frame plate 30'. Microswitches (not shown) are provided to detect the positions of the rams at the extremities of travel.

Operation of the piston and cylinder drives the chain urging the ram 57 along the track to push pallets therefrom into the entry end of the forward guideway.

Figure 4:
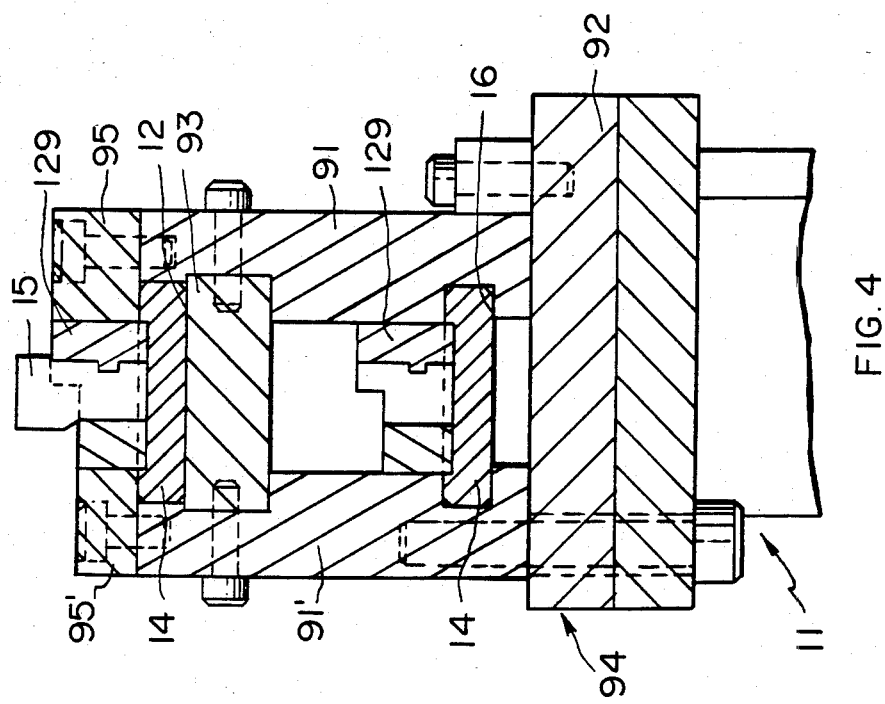
FIG. 4 is a cross-sectional view taken along line 4—4 of FIG. 3.

As shown more particularly in FIG. 4, the forward and return guideways 12 and 16 are defined by rebated faces of a pair of spaced parallel, longitudinally extending frame members 91, 91' which are secured to a bridging horizontal support beam 93 and providing a base of the forward guideway. The frame members are supported at intervals along their lengths by horizontal support plates 93 of the frame 11. Cover plates 95, 95' are mounted on the upper ends of the frame members 91, 91' to overlie the bed. Thus, as shown, the guideways confine the pallets 12, 16 in an interference fit permitting only sliding movement therealong.

Figure 5:
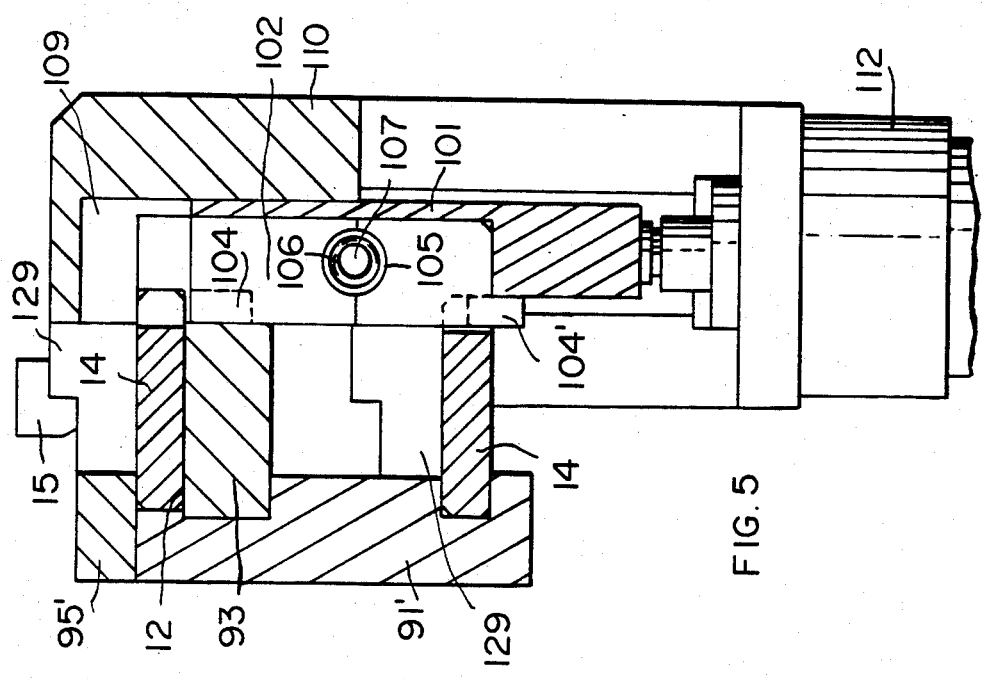
FIG. 5 is a cross-sectional view taken along line 5—5 of FIG. 3.

As shown in FIGS. 3 and 5, the pilot mechanisms 21, 21' each comprise a vertically extending pilot head 101 stepped to define a land 102 extending flag fashion therefrom. Surface portions 104, 104' of the land 102 adjacent the rebates are aligned to protrude into the guideways and are canted to provide pallet engaging cam surfaces inclined to the longitudinal axis of the guideways. A bore 105 is formed centrally in the head and carries a compression spring 106 located between friction discs 107. The head 101 is mounted for vertical reciprocation in a recess 109 in a frame part 110 by a double acting piston and cylinder 112 supported by upper and lower brackets 113, 114 fixed to the frame part 110 and the frame extension respectively. The frame part 110 is bolted over a slot 111 machined in the frame member 91' with the head land 102 aligned for reciprocation into and out from the upper and lower guideways alternately to bring the cam surfaces 104, 104' into engagement with the pallets on the upper and lower guideways, respectively, the friction discs 107 being biassed against surfaces of the guideway to steady such movement. The vertical position of the head is detected by vertically spaced microswitches 114, 114' aligned with a piston extension 115.

Figure 11:
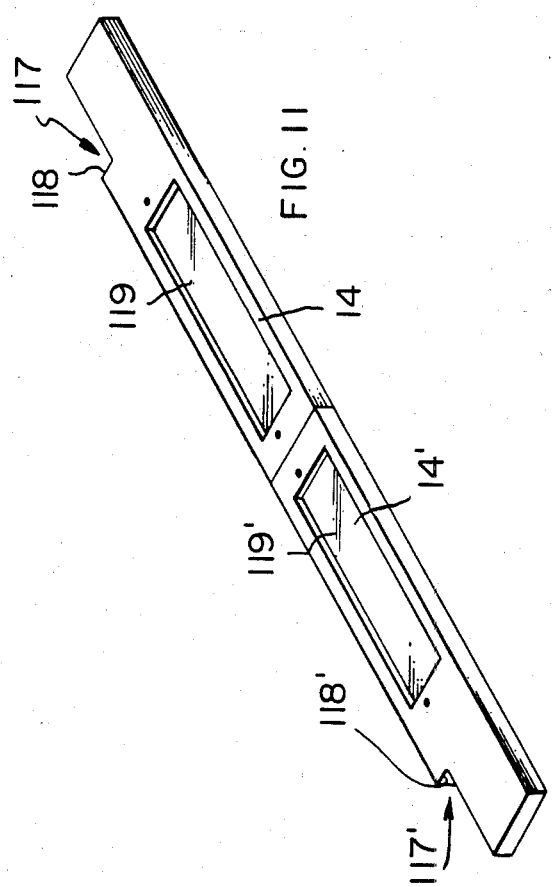
FIG. 11 is a perspective view of a pair of pallets.

As shown in FIG. 11, each pallet 14, 14' is machined to precise identical length from a block, generally rectangular in plan, and formed with cut outs 117, 117' at first ends for receiving pilot lands 102. The cut out 117 is on an opposite side from the cut out 117' so that both cut outs will define shoulders 118, 118' on the same side of the guideway for engagement with the can surfaces at opposite ends of the lands 102 Recesses 119, 119' are formed in the blocks to provide seats for connector supports 129, the precise shape of which will be determined by the configuration of the connector to be carried by the pallet.

Each workstation 13, 13' is closely similar to that described in European Patent Application No. 81304368.4 (Publication No. 0050422), the disclosure of which is incorporated herein by reference and which comprises a wire holding head 120 associated with a pair of wire insertion rams 121, 121' and wire feed means (not shown). In operation, the wire holding head 13 forms a loop in a leading end portion of a wire 122 fed from a supply, the ram 121' terminates the wire end in a preselected terminal of a leading connector of the connecting pairs 15, the head subsequently indexes into alignment with a preselected terminal of the trailing connector 15 of the pair while the wire loop is extended to desired length and the ram 121' severs and terminates the trailing end of the wire loop in the terminal of the trailing connector. Additional wires 122', etc. are terminated in the connector pair at successive workstations 13' etc. enabling harnesses to be progressively fabricated as the connector pair travels along the guideway.

The operation of the feed mechanism will now be described with particular reference to FIGS. 1, 2a–2d and FIG. 10. It should be noted that in FIGS. 2a–2d, the connector holders have been omitted for clarity and the pallets shown enlarged.

As shown in FIG. 1 and FIG. 2a, after a wire terminating step and immediately prior to indexing (X in FIG. 10), both pilots are in their lower positions engaging shoulders 118, 118' of the leading and trailing pallets on the return guideway while both lifts 18, 18' are in their upper positions aligned with the entry and exit ends of the upper guideway 12. Fresh connectors 15, 15' have been loaded onto pairs of empty pallets on the lift 18. The rams of both indexing mechanisms 17, 17' are in their rightmost positions. The piston and cylinder 70 (FIG. 8) is then operated to drive the ram 57 to its leftmost position shunting the two pallets from the lift 18 onto the entry end of the guideway 12 and the leading pallets pair with fully completed harnesses from the exit end of the guideway onto the lift 18' thereby moving the ram 57' of the indexing mechanism 17' to its leftmost position to the condition shown in FIG. 2b. The indexing mechanism 17' provides a desirable braking effect throughout the movement. During the final stages of movement of the pallets, the left pilot 21' is raised (as shown in FIG. 2b) to check the movement of the leading pallet. The right pilot 21 is raised at the end of the movement to engage the shoulder 118 of the trailing pallet urging the pallets together into end-to-end engagement in precise alignment with the work stations and confining them between entry and exit ends of the guideway as shown in FIG. 2c. The harness is then removed from the pallets on the left lift 18. Both lifts 18 and 18' are then lowered into alignment with exit and entry ends of the return guideway 16, to the condition shown in FIG. 2d, while wires are terminated in connectors on the forward guideway 12. The indexing mechanism 17' on lift 18' is then operated to shunt the empty pallets therefrom onto the entry end of the return guideway and to expel the leading pair of pallets onto the lift 18 to the condition shown in FIG. 2e. Finally, both lifts 18 and 18' are raised to convey the empty pallets on the lift 18 into alignment with the forward guideway 16 to receive fresh connectors and the pilots 21, 21' then lowered to confine together the pallets on the return guideway to obtain the condition shown in 2a and at Y in FIG. 10.

We claim:

1. Apparatus for feeding electrical connectors (15, 15) into alignment with respective workstations (13, 13') arranged in a row comprising a frame (11) providing a feed path (12) extending past the workstations (13, 13') between an exit and an entry end; a plurality of individual pallets (14, 14') having precise longitudinal dimensions and adapted to carry respective connectors (15, 15); means to shunt (17, 17') a series of the pallets (14, 14') in end-to-end relation along the feed path (12) substantially to fill the feed path (12) between the entry and exit ends bringing pallets (14, 14') sequentially into coarse alignment with respective workstations (13, 13'); pallet positioning means (21, 21') comprising means including at least one cam member (104, 104') mounted on the frame (11) adjacent opposite ends of the feed path (12) and operable to reciprocate perpendicularly to the feed path (12) into and out from engagement with the leading and ultimate pallet (14, 14') of the series of pallets (14, 14') subsequent to operation of the indexing means (17, 17'), to urge the pallets (14, 14') longitudinally of the feed path (12) both into end-to-end abutment and together as a series precisely to align respective connectors (15, 15') with the workstations; and pallet return means comprising a return path (16) having an entry end adjacent the exit end of the feed path (12) and an exit end adjacent the entry end of the feed path, means (18, 18') being provided to convey the pallets (14, 14') between the exit end of the return path (16) and the entry end of the feed path (12).

2. Apparatus according to claim 1 in which the or each cam member (104, 104') is operable to reciprocate relative to the feed path (12) and return path (16) alternately into and out from engagement with at least the leading or ultimate pallets (14, 14') of the series of pallets (14, 14') on the feed path (12) and the pallets on the return path (16) respectively, subsequent to and during the operation of the indexing means (17, 17'), respectively.

3. Apparatus according to claim 1 in which the return path (16) extends below the feed path (12) and has an entry and an exit end adjacent the entry and exit ends respectively of the feed path (12), first and second pallet lifts (18, 18') being mounted for movement between the exit and entry ends of the return path (16) and the entry end and exit ends of the feed path (12) to deliver pallets (14, 14') between the feed and return paths (12 and 16).

4. Apparatus according to claim 3 in which the indexing means (17, 17') comprises pallet engaging rams (57) carried by endless belts (62) mounted on the lifts (18, 18') to extend longitudinally of the feed path (12), means (70) being provided to reciprocate the belts (62) thereby to deliver and receive pallets (14, 14') from the feed path (12) and return path (16), respectively.

5. Apparatus according to claim 1 in which each pallet (14, 14') is formed with a cam admitting rebate (117') a transverse edge of which provides a cam engaging shoulder (118).

6. Apparatus according to claim 2 in which the cam member comprises cam surfaces (104, 104') formed on respective opposite ends of a land (102) extending flag fashion from a head (101), mounted for vertical reciprocation transversely of the feed and return paths (12, 16) in a recess (109) in a frame part (110) secured to the frame (11) such that the cam surfaces (104, 104') are brought into and out from the feed and return paths (12, 16) by the reciprocation.

* * * * *